United States Patent [19]
Malinow et al.

[11] Patent Number: 5,735,478
[45] Date of Patent: Apr. 7, 1998

[54] SEAT BELT WEBBING RETRACTOR

[75] Inventors: Ivanna G. Malinow, Clinton Township; Harley L. Kapanka, Rochester; Lloyd M. Snyder, Sterling Heights, all of Mich.

[73] Assignee: TRW Vehicle Safety Systems Inc., Lyndhurst, Ohio

[21] Appl. No.: 688,378

[22] Filed: Jul. 30, 1996

[51] Int. Cl.$^6$ ............................................. B60R 22/34
[52] U.S. Cl. ............................................. 242/376.1
[58] Field of Search ...................... 242/376.1, 379, 242/379.1, 382.6; 297/475–478; 280/806, 807

[56] References Cited

U.S. PATENT DOCUMENTS

| | | |
|---|---|---|
| 3,876,164 | 4/1975 | Dully. |
| 4,136,841 | 1/1979 | Fohl. |
| 4,470,557 | 9/1984 | Ernst. |
| 4,673,144 | 6/1987 | Byford. |
| 5,029,770 | 7/1991 | Tanaka et al.. |

FOREIGN PATENT DOCUMENTS 2618680   11/1977   Germany ............... 242/376.1

*Primary Examiner*—John M. Jillions
*Attorney, Agent, or Firm*—Tarolli, Sundheim, Covell, Tummino & Szabo

[57] ABSTRACT

A seat belt retractor (10) includes a spool (100) on which belt webbing (16) is wound. The spool (100) is fixed for rotation with a shaft (110). The shaft (110) is acted upon by gravity with a first force. The seat belt webbing (16) provides a second force on the shaft acting counter to the first force. A means, such as a pair of M-shaped springs (130, 140), provides a biasing force on the shaft acting counter to the first force. The springs (130, 140) may also bias the spool (100) axially away from side walls (34, 36) of the retractor frame (30).

17 Claims, 5 Drawing Sheets

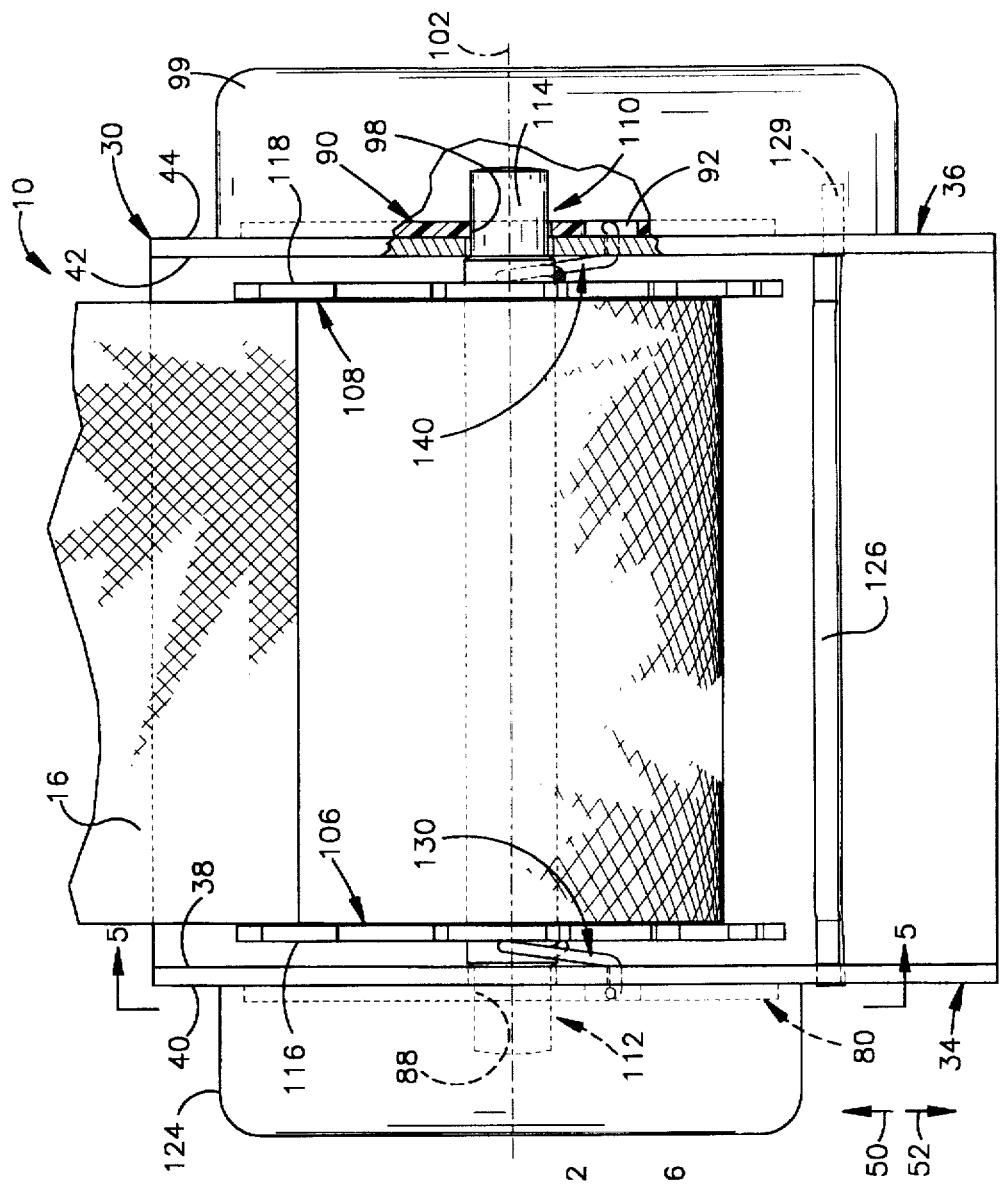

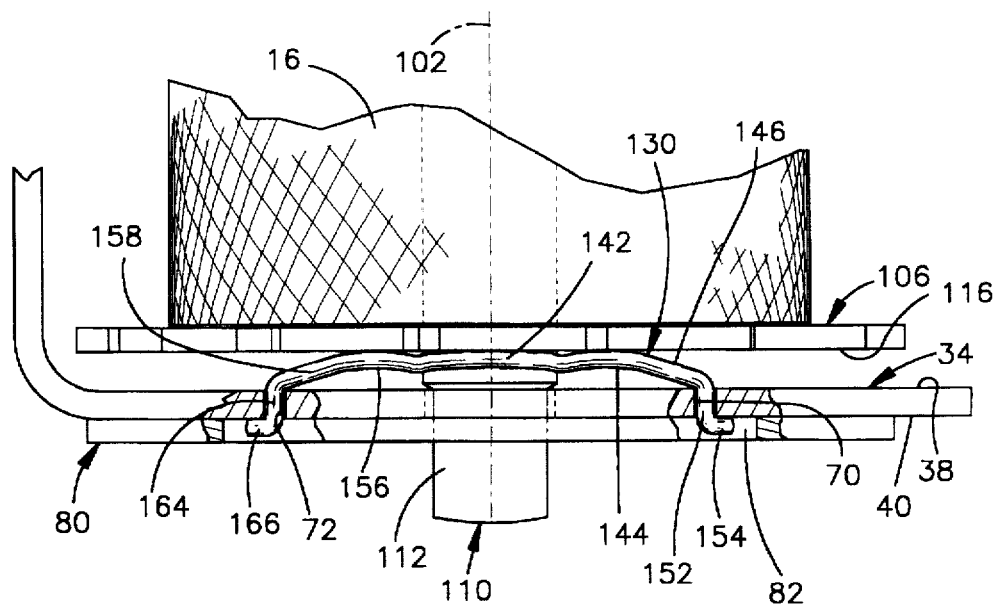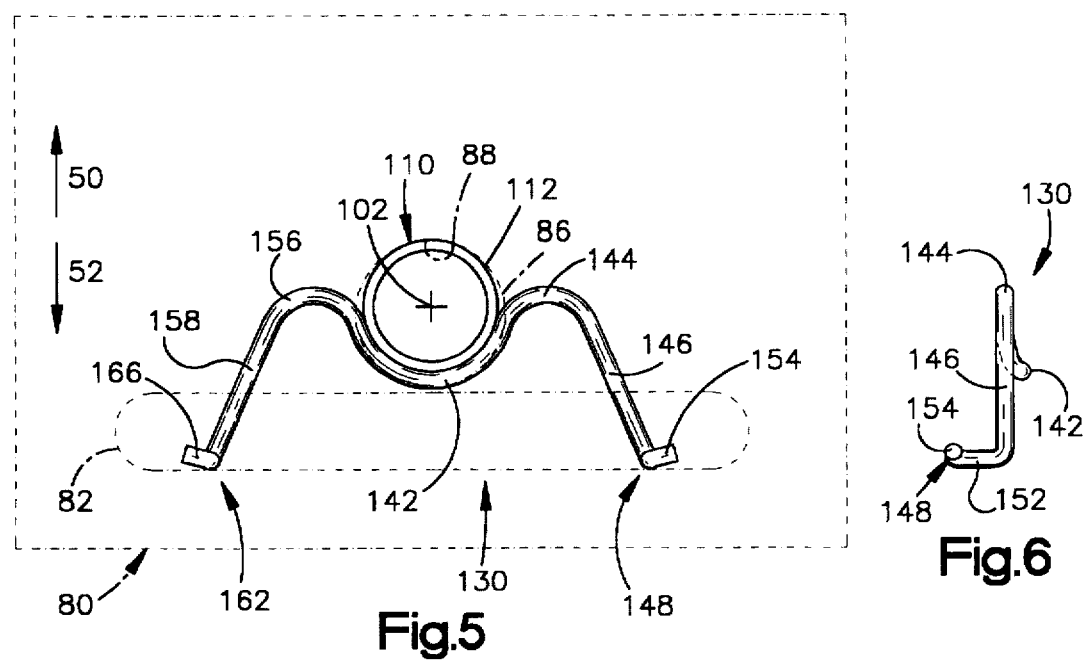

SEAT BELT WEBBING RETRACTOR

BACKGROUND OF THE INVENTION

1. Technical Field

The present invention relates to a vehicle seat belt webbing retractor, and, in particular, to a retractor which minimizes noise generated by vibration of the retractor shaft.

2. Description of the Prior Art

A known seat belt system includes a length of seat belt webbing wound on a spool of a retractor. The belt webbing is extensible about the vehicle occupant to help protect the occupant in the event of a vehicle collision. The spool is fixed for rotation with a retractor shaft extending between two side walls of a frame. The ends of the retractor shaft are supported for rotation in the frame side walls. Under normal driving conditions, the retractor shaft and spool can vibrate in the frame side walls, causing noise which may be objectionable to the vehicle occupant.

SUMMARY OF THE INVENTION

The present invention is a vehicle seat belt retractor for use in association with a length of seat belt webbing extensible about a vehicle occupant to help protect the vehicle occupant. The retractor comprises a spool on which the seat belt webbing is wound and which is rotatable about an axis in a belt retraction direction and in an opposite belt withdrawal direction. A shaft is fixed for rotation with the spool. The shaft is acted upon by gravity with a first force. The seat belt webbing provides a second force on the shaft acting counter to the first force when the seat belt webbing is withdrawn from the spool. The retractor includes means for providing a biasing force on the shaft acting counter to the first force.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle seat belt system including a seat belt webbing retractor constructed in accordance with a first embodiment of the present invention;

FIG. 2 is a front elevational view, partially in section, of the retractor of FIG. 1;

FIG. 4 is a bottom plan view of a first end portion of the retractor, with parts removed;

FIG. 5 is a schematic side elevational view of parts of the first end portion of the retractor;

FIG. 6 is an end view of a positioning spring which forms a part of the retractor of FIG. 1;

DESCRIPTION OF PREFERRED EMBODIMENTS OF THE INVENTION

Figure 3:
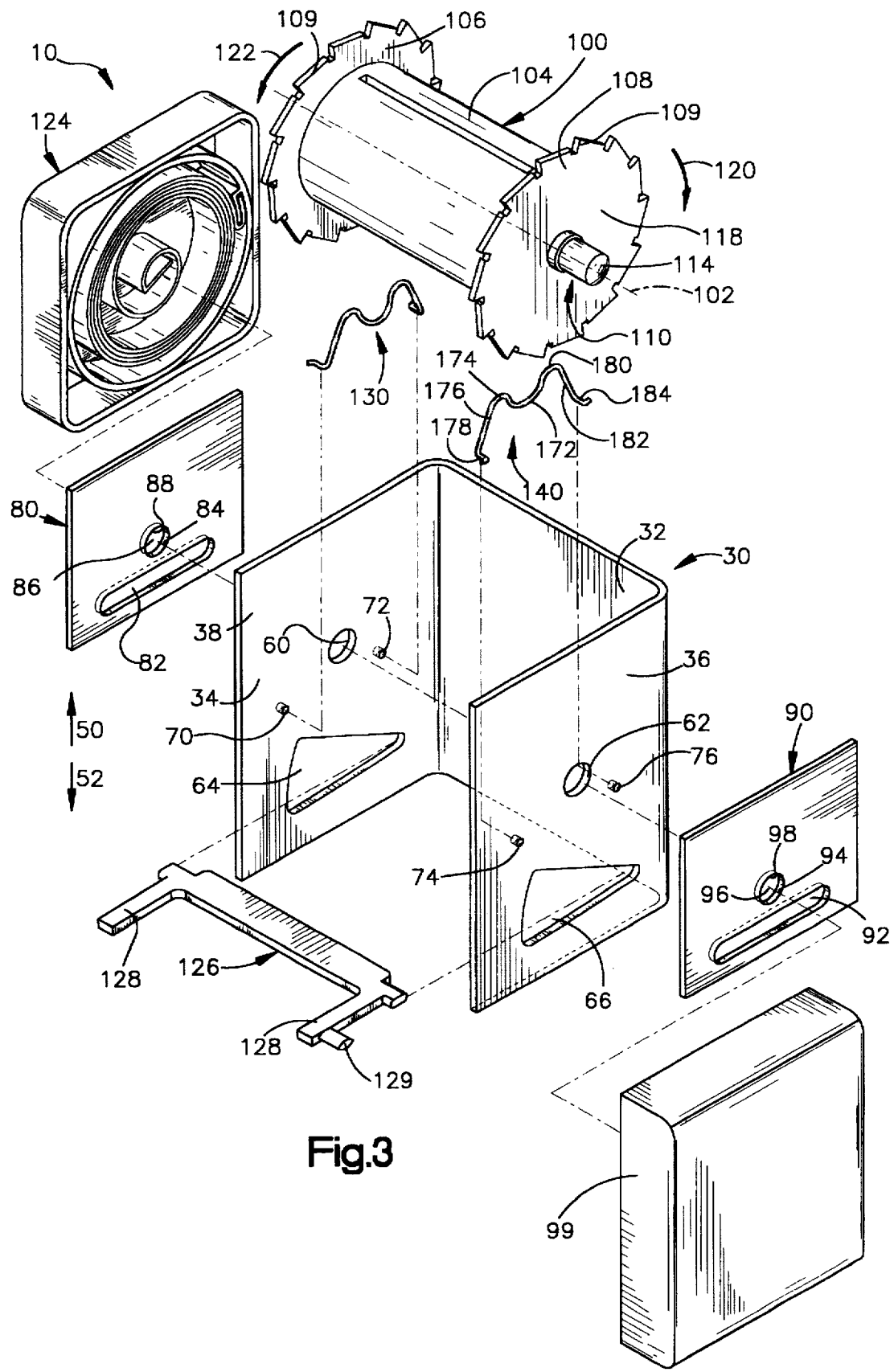
FIG. 3 is an exploded perspective view of the retractor of FIG. 1.
Figure 8:
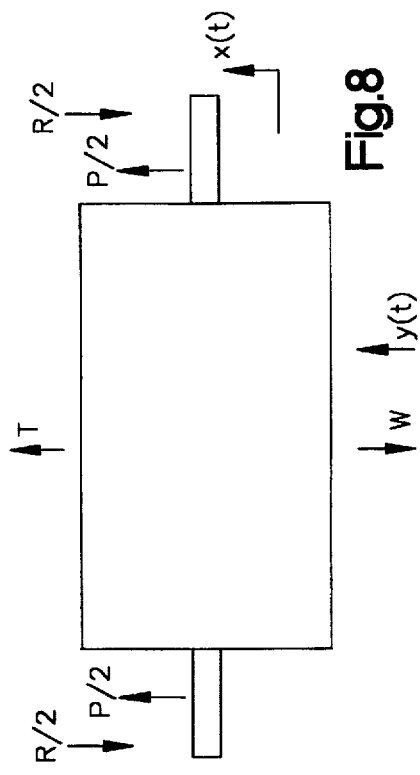
FIG. 8 is a free body diagram of the forces acting on the spool of the retractor of FIG. 1.

The present invention relates to a vehicle seat belt webbing retractor, and, in particular, to a retractor having means for positioning the retractor shaft to minimize noise generated by the retractor. The present invention is applicable to various retractor constructions. As representative of the present invention, FIG. 1 illustrates a seat belt webbing retractor 10. The retractor 10 is incorporated in a three-point continuous loop seat belt system 12 for use in helping to protect an occupant of a vehicle.

During operation of the vehicle, the occupant of the vehicle sits on a seat 14 which is illustrated as a front passenger seat in the vehicle. A length of belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body 18 on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly 22 moves along the belt webbing 16, and the belt webbing 16 is unwound from the retractor 10. When the belt webbing 16 has been pulled across the lap and torso of the occupant, the tongue assembly 22 is connected with a buckle 26, as shown in 5 dashed lines in FIG. 1. The buckle 26 is connected to the vehicle body 18 and is disposed on the side of the seat 14 opposite the anchor point 20. When the seat belt system 12 is thus buckled, the length of the belt webbing 16 is divided by the tongue assembly 22 into a torso portion 28, which extends across the torso of the occupant, and a lap portion 29, which extends across the lap of the occupant.

The retractor 10 (FIGS. 2 and 3) includes a frame 30 which is fixed to the vehicle body 18 in a manner not shown. The frame 30 is a single piece of sheet metal stamped and formed to a U-shaped configuration as best seen in FIG. 3. The frame 30 includes a back wall 32 and spaced parallel side walls 34 and 36 which extend generally perpendicular to the back wall. The first side wall 34 has an inner side surface 38 and an outer side surface 40 (FIG. 2). The second side wall 36 has an inner side surface 42 and an outer side surface 44.

When the retractor 10 is mounted in the vehicle, the frame walls 32, 34 and 36 extend generally vertically. An upward direction in the vehicle is indicated by the arrow 50 (FIGS. 2 and 3) and an opposite downward direction in the vehicle is indicated by the arrow 52. The force of gravity on the retractor 10 acts with a first force in the downward direction indicated by the arrow 52. The seat belt webbing 16 resists winding onto the retractor 10 with a second force, counter to the first force, which acts generally in the upward direction indicated by the arrow 50.

A circular shaft opening 60 is formed in the first side wall 34 of the frame. A circular shaft opening 62, identical to the shaft opening 60, is formed in the second side wall 36. A wedge-shaped lock pawl opening 64 in the first side wall 34 is aligned with a wedge-shaped lock pawl opening 66 in the second side wall 36.

The first side wall 34 of the frame 30 includes a pair of spring mounting apertures 70 and 72 spaced on opposite sides of, and below, the shaft opening 60. The second side wall 36 of the frame 30 similarly includes a pair of spring mounting apertures 74 and 76 spaced on opposite sides of, and below, the shaft opening 62 in the second side wall of the frame.

A spring plate 80 is attached in a manner not shown to the outer side surface 40 of the first side wall 34 of the frame. The spring plate 80 is preferably made from plastic. The spring plate 80 has a clearance slot 82 which overlies the spring mounting apertures 70 and 72 in the first side wall 34 of the frame 30.

Figure 7:
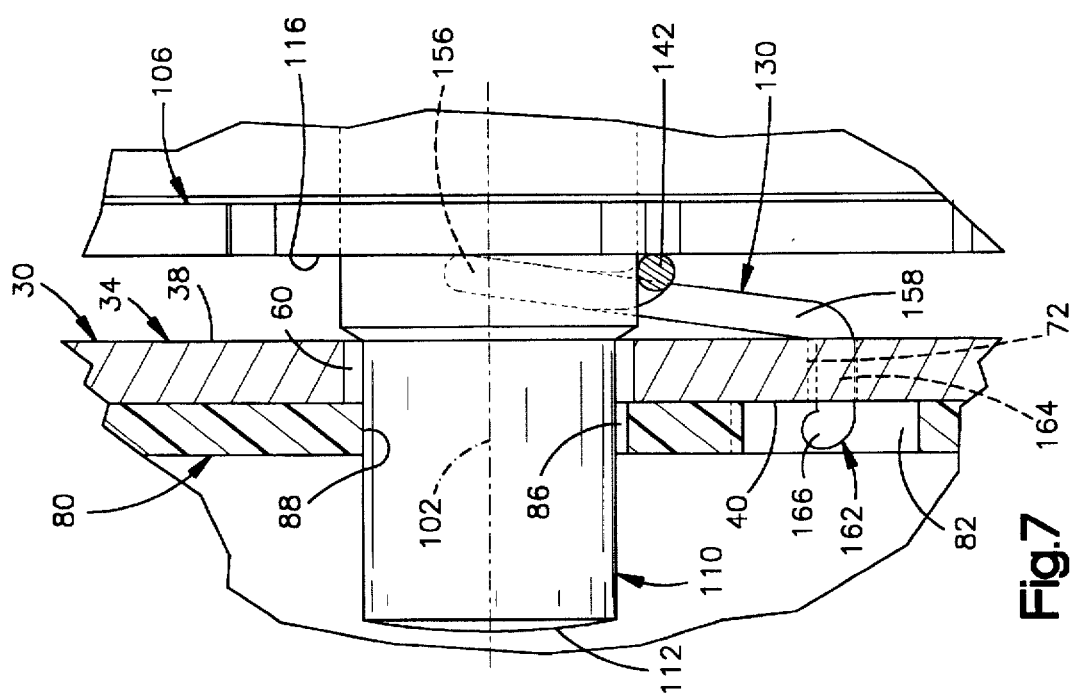
FIG. 7 is an enlarged view of a portion of FIG. 2.

The spring plate 80 has a cylindrical surface 84 which defines a circular shaft opening 86 in the spring plate. The cylindrical surface 84 has an upper portion 88 (FIGS. 3 and 7). The shaft opening 86 in the spring plate 80 overlies the shaft opening 60 in the first side wall 34 of the frame 30. The diameter of the shaft opening 86 in the spring plate 80 is less than the diameter of the shaft opening 60 in the first side wall 34 of the frame 30.

A sensor plate 90 is attached in a manner not shown to the second side wall 36 of the frame 30. The sensor plate 90 as illustrated is identical in configuration to the spring plate. The sensor plate 90 has a clearance slot 92 which overlies the spring mounting apertures 74 and 76 in the second side wall 36 of the frame 30.

The sensor plate 90 has a cylindrical surface 94 which defines a circular shaft opening 96 in the sensor plate. The cylindrical surface 94 has an upper portion 98 (FIGS. 2 and 3). The shaft opening 96 in the sensor plate 90 overlies the shaft opening 62 in the second side wall 36 of the frame 30. The diameter of the shaft opening 96 in the sensor plate 90 is less than the diameter of the shaft opening 62 in the second side wall 36 of the frame 30.

A known sensor mechanism (not shown) for sensing sudden vehicle deceleration, such as occurs in a vehicle collision, is fixed to the sensor plate 90. The sensor mechanism projects outwardly from the sensor plate 90, in a direction away from the frame side wall 36. A sensor cover 99 encloses the sensor mechanism.

The retractor 10 includes a spool 100 which has a longitudinal central axis 102. The spool 100 includes a sleeve 104 on which the belt webbing 16 is wound. The sleeve 104 has a cylindrical configuration centered on the axis 102.

First and second spool locking ratchet wheels 106 and 108 are disposed at opposite ends of the sleeve 104 and are fixed for rotation with the sleeve. A radially extending outer side surface 116 (FIG. 2) of the first ratchet wheel 106 faces the inner side surface 38 of the first side wall 34 of the frame 30. A radially extending outer side surface 118 of the second ratchet wheel 108 faces the inner side surface 42 of the second side wall 36 of the frame 30. A plurality of ratchet teeth 109 are disposed in a circular array on the outer periphery of each one of the spool locking ratchet wheels 106 and 108.

The spool 110 is fixed for rotation with a cylindrical metal retractor shaft 110. The shaft 110 has a longitudinal central axis which is coincident with the axis 102 of the spool 100. A first end portion 112 (FIGS. 2 and 7) of the shaft 110 projects axially from the left end (as viewed in FIG. 2) of the sleeve 104. The first end portion 112 of the shaft 110 extends through the shaft opening 60 in the first side wall 34 of the frame 30 and through the shaft opening 86 in the spring plate 80. The diameter of the first end portion 112 of the shaft 110 is less than the diameter of the shaft opening 86 in the spring plate 80.

A second end portion 114 (FIGS. 2 and 3) of the retractor shaft 110 projects axially from the right end (as viewed in FIG. 2) of the sleeve 104. The second end portion 114 of the shaft 110 extends through the shaft opening 62 in the second side wall 36 of the frame 30 and through the shaft opening 96 in the sensor plate 90. The diameter of the second end portion 114 of the shaft 110 is less than the diameter of the shaft opening 96 in the sensor plate 90.

The shaft 110 supports the spool 100 for rotation about the axis 102, in a belt retraction direction 120 (FIG. 3) and in an opposite belt withdrawal direction 122. A rewind spring mechanism 124 is fixed to the spring plate 80 and is connected with the first end portion 112 of the shaft 110. The rewind spring mechanism 124 biases the spool 100 and the shaft 110 for rotation about the axis 102 in the belt retraction direction 120.

A lock pawl 126 (FIG. 3) is disposed adjacent to the spool locking ratchet wheels 106 and 108. The lock pawl 126 is preferably made from metal and includes at its opposite ends a pair of locking arms 128. The lock pawl 126 extends through the lock pawl openings 64 and 66 in the frame 30 and is supported on the frame for pivotal movement relative to the frame. A cam tab 129 (FIGS. 2 and 3) of the lock pawl 126 extends axially outward from one locking arm 128 through the lock pawl opening 66 in the second side wall 36 of the frame 30 in a direction away from the frame. The cam tab 129 is connected with the sensor mechanism so that in the event of vehicle deceleration above a predetermined level, the lock pawl 126 is pivoted into locking engagement with the ratchet wheels 106 and 108 to block rotation of the spool 100 in the belt withdrawal direction 122.

The retractor 10 further includes first and second positioning springs 130 and 140 (FIGS. 2 and 3) for positioning the spool 100 radially and axially relative to the frame 30. The first positioning spring 130 is disposed between the inner side surface 38 of the first side wall 34 of the frame 30 and the outer side surface 116 of the first ratchet wheel 106. The second positioning spring 140 is disposed between the inner side surface 42 of the second side wall 36 of the frame 30 and the outer side surface 118 of the second ratchet wheel 108.

The first positioning spring 130 (FIGS. 4–6) is preferably made from steel wire, such as spring wire, but could, alternatively, be made from another elastic material including a plastic material. The first spring 130 has an M-shaped configuration including an arcuate central portion 142. The central portion 142 has an inside diameter which is approximately equal to the outside diameter of the first end portion 112 of the shaft 110.

The central portion 142 of the first spring 130 is connected by a first arcuate section 144 to a linear first leg portion 146 of the first spring. The first leg portion 146 of the first spring 130 terminates in an L-shaped first end portion 148. The first end portion 148 includes a first mounting part 152 which extends perpendicular to the first leg portion 146 and a second mounting part 154 which extends perpendicular to the first mounting part 152. The second mounting part 154 of the end portion 148 lies in a plane which is parallel to, but offset from, the plane of the first leg portion 146 of the first spring 130.

The central portion 142 of the first spring 130 is connected by a second arcuate section 156 of the first spring to a linear second leg portion 158. The second leg portion 158 of the first spring 130 terminates in an L-shaped second end portion 162. The second end portion 162 includes a first mounting part 164 (FIG. 4) which extends perpendicular to the second leg portion 158 and a second mounting part 166 which extends perpendicular to the first part 164. The second mounting part 166 of the second end portion 162 lies in a plane which is parallel to, but offset from, the plane of the second leg portion 158 of the first spring 130.

The first and second leg portions 146 and 158 of the first spring 130 are co-planar. The second mounting parts 154 and 166 of the first spring 130 are also co-planar. When the first spring 130 is in a free or unstressed condition, as seen in FIG. 6, the central portion 142 of the first spring 130 is axially offset from the first and second leg portions 146 and 158, in a direction away from the plane of the second mounting parts 154 and 166 of the first spring.

The second spring 140 (FIGS. 2 and 3) is identical to the first spring. The second spring 140 has an M-shaped configuration including an arcuate central portion 172. The central portion 172 has an inside diameter which is approximately equal to the outside diameter of the second end portion 114 of the retractor shaft 110.

The central portion 172 of the second spring 140 is connected by a first arcuate section 174 to a linear first leg portion 176 of the second spring. The first leg portion 176 of the second spring 140 terminates in an L-shaped first end portion 178. The first end portion 178 includes a first mounting part (unnumbered) which extends perpendicular to the first leg portion 174 and a second mounting part (unnumbered) which extends perpendicular to the first mounting part. The second mounting part of the first end portion 178 lies in a plane which is parallel to, but offset from, the plane of the first leg portion 176 of the second spring 140.

The central portion 172 of the second spring 140 is connected by a second arcuate section 180 of the second spring to a linear second leg portion 182. The second leg portion 182 of the second spring 140 terminates in an L-shaped second end portion 184. The second end portion 184 includes a first mounting part (unnumbered) which extends perpendicular to the second leg portion 182 and a second mounting part (unnumbered) which extends perpendicular to the first mounting part. The second mounting part of the second end portion 184 lies in a plane which is parallel to, but offset from, the plane of the second leg portion 182 of the second spring 140.

The first and second leg portions 176 and 182 of the second spring 140 are co-planar. The second mounting parts of the second spring 140 are also co-planar. When the second spring 140 is in a free or unstressed condition, the central portion 172 of the second spring is axially offset from the first and second leg portions 176 and 182, in a direction away from the plane of the second mounting parts of the second spring.

When the first positioning spring 130 (FIGS. 4 and 7) is assembled in the retractor 10, the first mounting part 164 of the second end portion 162 extends through the spring mounting aperture 72 in the first side wall 34 of the frame 30. The second mounting part 166 of the second end portion 162 overlies the outer side surface 40 of the second side wall 34 of the frame. The second mounting part 166 is disposed in the clearance slot 82 in the spring plate 80.

The first mounting part 152 of the first end portion 148 of the first spring 130 extends through the other spring mounting aperture 70 in the first side wall 34 of the frame 30° The second mounting part 154 of the first end portion 148 overlies the outer side surface 40 of the first side wall 34 of the frame 30. The second mounting part 154 is disposed in the clearance slot 82 in the spring plate 80.

The central portion 142 and the arcuate sections 144 and 156 of the first spring 130 engage the outer side surface 116 of the first ratchet wheel 106. The central portion 142 of the first spring 130 also engages the first end portion 112 of the retractor shaft 110. Specifically, the central portion 142 of the first spring 130 (FIG. 5) wraps partially around the first end portion 112 of the retractor shaft 110, at a location underneath the shaft.

When the second positioning spring 140 is assembled in the retractor 10, the first mounting part of the first end portion 178 of the second spring extends through the spring mounting aperture 74 in the second side wall 36 of the frame 30. The second mounting part of the first end portion 178 overlies the outer side surface 44 of the second side wall 36 of the frame 30. The second mounting part is disposed in the clearance slot 92 in the sensor plate 90.

The first mounting part of the second end portion 184 of the second spring 140 extends through the other spring mounting aperture 76 in the second side wall 36 of the frame 30. The second mounting part of the second end portion 184 of the second spring 140 overlies the outer side surface 44 of the second side wall 36 of the frame 30. The second mounting part is disposed in the clearance slot 92 in the sensor plate 90.

The central portion 172 and the arcuate sections 174 and 180 of the second spring 140 engage the outer side surface 118 of the second ratchet wheel 108. The central portion 172 of the second spring 140 also engages the second end portion 114 of the retractor shaft 110. Specifically, the central portion 172 of the second spring 140 wraps partially around the second end portion 114 of the retractor shaft 110, at a location underneath the shaft.

When the positioning springs 130 and 140 are thus assembled in the retractor 10, the positioning springs support the retractor shaft 110 for rotation about the axis 102. The positioning springs 130 and 140 also urge the retractor shaft 110 in the upward direction 50 against the spring plate 80 and the sensor plate 90. Specifically, the central portion 142 of the first spring 130 exerts a biasing force on the first end portion 112 of the shaft 110. The biasing force acts in the upward direction 50 (FIGS. 5 and 7), counter to the force of gravity acting on the shaft 110. The biasing force biases the first end portion 112 of the shaft 110 into engagement with the upper surface portion 88 of the spring plate The central portion 172 of the second spring 140 exerts a biasing force on the second end portion 114 of the shaft 110. The biasing force acts in the upward direction 50, counter to the force of gravity acting on the shaft. The biasing force of the second spring 140 biases the second end portion 114 of the shaft 110 into engagement with the upper surface portion 98 of the sensor plate 90.

The biasing force of the springs 130 and 140, together with the upwardly directed force placed on the spool 100 by the belt webbing 16, opposes the force of gravity acting downward on the spool in the direction 52. This combined upwardly directed force on the spool 100 maintains the retractor shaft 110 in rotating engagement with the upper surfaces 88 and 98 on the spring plate 80 and the sensor plate 90, respectively, and minimizes vertical movement of the shaft relative to the frame 30 and the plates 80 and 90. As a result, the generation of noise due to vibration in the retractor 10, caused by vertical movement of the shaft 110, is minimized.

The positioning springs 130 and 140 also position the spool 100 axially relative to the frame 30. The first spring 130 is compressed axially between the first ratchet wheel 106 and the first side wall 34 of the frame 30. Specifically, the central portion 142 of the first spring 130 is axially deformed from a position in which the central portion is axially offset from the first and second leg portions 146 and 148, as shown in FIG. 6, to a position in which the central portion is more nearly co-planar with the first and second leg portions, as shown in FIG. 4. The first spring 130 therefore exerts an axially directed force between the first side wall 34 of the frame 30 and the first ratchet wheel 106. This force biases the first ratchet wheel 106, and thereby the spool 100 as a whole, in a direction away from the inner side surface 38 of the first side wall 34 of the frame 30.

Similarly, when the second spring 140 is assembled in the retractor 10, the central portion 172 of the second spring is axially compressed between the second ratchet wheel 108 and the second side wall 36 of the frame 30. The second spring 140 therefore exerts an axially directed biasing force between the second side wall 36 of the frame 30 and the second ratchet wheel 108. This force biases the second ratchet wheel 108, and thereby the spool 100 as a whole, in a direction away from the inner side surface 42 of the second side wall 36 of the frame 30.

The axial biasing force of the first spring 130 is equal to and directed oppositely from the axial biasing force of the second spring 140. The spool 100 is, therefore, maintained in a position spaced apart from both the first and second side walls 34 and 36 of the frame 30. As a result, the generation of noise due to vibration in the retractor 10 caused by axial movement of the shaft 110 and the spool 100 is minimized.

Under normal driving conditions, the vehicle body 18 (FIG. 1) is subjected to a variety of excitation forces which cause periodic vertical displacement of the vehicle body 18 and the retractor 10 attached to the body. When sufficient biasing force or pre-load is provided on the shaft 110 by the positioning springs 130 and 140, objectionable noise caused by vibration in the retractor 10 can be reduced by the positioning springs as described above. The proper amount of pre-load force for the positioning springs 130 and 140 can be determined as follows.

A free body diagram of the shaft 110 and attached spool 100 is shown in FIG. 7, where:

T=tension force of the webbing 16;

P=total pre-load force of the springs 130 and 140;

R=reaction force;

W=weight of the shaft 110 and spool 100;

y(t)=displacement of the vehicle body 18; and x(t)=displacement of the shaft 110.

The displacement of the vehicle body 18 due to excitation forces may be expressed as a function of time as:

$$y(t)=Y \cos \omega t \quad (1)$$

where:

Y=maximum amplitude of the displacement;

ω=excitation frequency; and t=time.

Differentiating (1) to get the velocity of the vehicle body due to the excitation force provides:

$$y'=(-\omega Y) \sin \omega t \quad (2)$$

Differentiating (2) to get the acceleration of the vehicle body due to the excitation force provides:

$$y''=(-\omega^2 Y) \cos \omega t \quad (3)$$

Summing the forces on the shaft 110 and spool 100 in FIG. 7 provides:

$$T-W+2(P/2)-2(R/2)=mA_{shaft} \quad (4)$$

where m=the mass of the shaft and spool and $A_{shaft}$=the acceleration of the shaft; or $$A_{shaft}=1/m \ (T-W+P-R) \quad (5)$$

It is known that, absent any pre-load P, the contact between the shaft 110 and the plates 80 and 90 can be lost under certain vehicle conditions, causing the reaction force R to go to zero—that is, the acceleration of the shaft, x" (or $A_{shaft}$), is equal to the acceleration of the vehicle, y". The pre-load P is set high enough to maintain contact between the shaft 110 and the plates 80 and 90. For example, it may be desired to maintain $A_{shaft}$ at greater than 1 g.

Letting R=0 (which is the worst case condition) and T=W, then if P is, for example, set at twice the weight of the shaft 110 and spool 100, or 2 W, (5) becomes:

$$A_{shaft}=1/m(W-W+2W) \quad (6)$$

or $$A_{shaft}=1/m(2W) \quad (7)$$

Since W=mg, (7) becomes:

$$A_{shaft}=2g \quad (8)$$

Thus, a combined pre-load on the shaft 110, provided by the two M-shaped springs 130 and 140, of twice the combined weight of the shaft 110 and the spool 100, maintains $A_{shaft}$ above 1 g.

Figure 9:
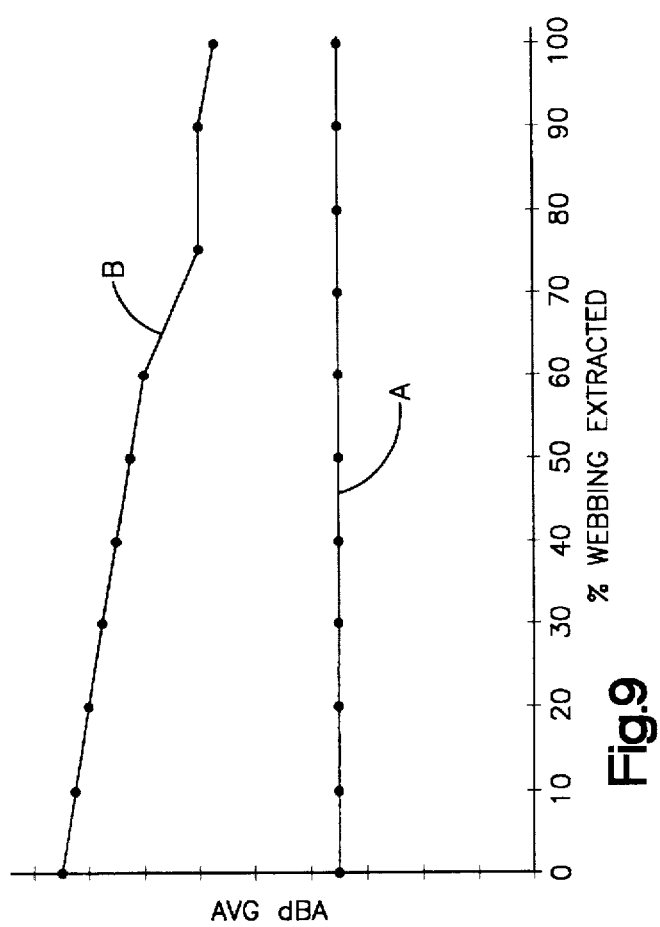
FIG. 9 is a graph showing comparative noise levels, measured as a function of the percentage of belt webbing extracted, of a control retractor and of the retractor of FIG. 1.

FIG. 9 shows the results of comparative testing performed on a retractor 10 (plot "A") which includes the positioning springs 130 and 140, and on a similar retractor (plot "B") not including the springs. Under identical excitation conditions, the retractor 10 provides a significant reduction in the level of overall noise emitted by the retractor, at all webbing extraction amounts. As can be seen from FIG. 9, greater reductions in the levels of noise emitted are achieved when a smaller percentage of the belt webbing 16 is extracted, as compared to the noise level reductions achieved when a larger amount of belt webbing is extracted. In addition, the noise level produced by the retractor 10, as more or less of the webbing 16 is extracted, is substantially constant within about 1 dBA.

Figure 10:
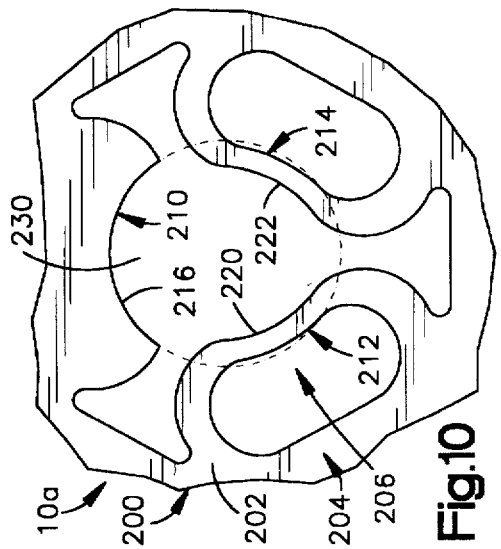
FIGS. 10 and 11 are schematic views of portions of a retractor constructed in accordance with a second embodiment of the present invention.
Figure 11:
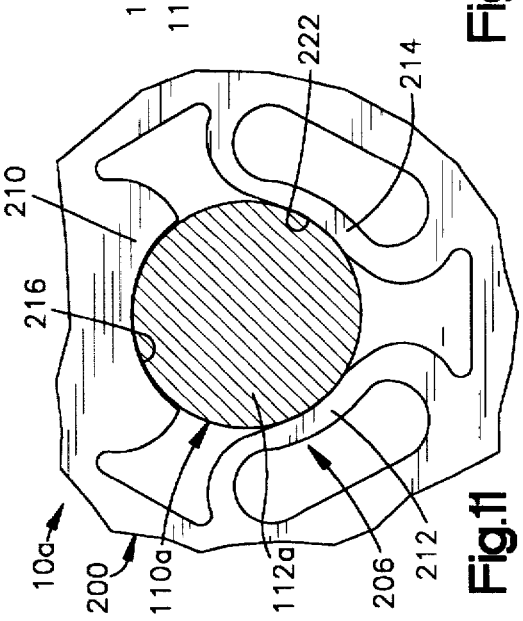

FIGS. 10–11 illustrate portions of a retractor 10a which is constructed in accordance with a second embodiment of the present invention. In the retractor 10a, a plastic spring plate 200 supports and biases a first end portion 112a of a retractor shaft 110a. The spring plate 200 may be substituted in the retractor 10 for the spring plate 80 and the first positioning spring 130. A sensor plate (not shown) of the retractor 10a, which is identical to the spring plate 200, supports and biases the second end portion (not shown in FIGS. 10–11) of the retractor shaft 110a. The sensor plate of the retractor 10a may be substituted in the retractor 10 for the sensor plate 90 and the second positioning spring 140.

The spring plate 200 (FIGS. 10 and 11) is fixed to the first side wall (not shown) of the frame. The spring plate 200 is molded from one piece of plastic, such as acetal, and includes a planar main wall portion 202 and a bearing section 204. The bearing section 204 includes a hub 206. The hub 206 comprises three portions of the spring plate 200 which support the first end portion 112a of the retractor shaft 110a at three spaced apart locations.

Specifically, the hub 206 includes an upper portion 210, a first spring arm 212 and a second spring arm 214. The upper portion 210 of the hub 206 is a rigid part of the main wall portion 202 of the spring plate 200. The upper portion 210 of the hub 206 has a cylindrical inner surface 216. The surface 216 is configured as a portion of a cylinder which has a diameter slightly greater than the outside diameter of the first end portion 112a of the shaft 110a.

The first spring arm 212 is resilient or flexible, and is movable relative to the upper portion 210. The first spring arm 212 is connected at its opposite ends to the remainder of the bearing section 204 and has a cylindrical inner surface 220. The surface 220 is configured as a portion of a cylinder which has a diameter slightly greater than the outside diameter of the first end portion 112a of the shaft 110a.

The second spring arm 214 is similar in configuration to the first spring arm 212. The second spring arm 214 is resilient or flexible, that is, movable relative to the upper portion 210. The second spring arm 214 is connected at its opposite ends to the remainder of the bearing section 204 and has a cylindrical inner surface 222. The surface 222 is configured as a portion of a cylinder which has a diameter slightly greater than the outside diameter of the first end portion 112a of the shaft 110a.

When the spring plate 200 is in a free or unstressed condition, the spring arms 212 and 214 are in a radially inward position as shown in FIG. 10. The spring arms 212 and 214, and the upper portion 210 define an opening 230 into which the end portion 112a of the retractor shaft 110a is inserted during assembly of the retractor 10a.

When the spring plate 200 is assembled with the first end portion 112a of the retractor shaft 110a, the spring arms 212 and 214 are moved radially outward by the retractor shaft, to the position shown in FIG. 11, against the inherent resistance of the spring arms. Each one of the spring arms 212 and 214 exerts a radially inwardly directed biasing force on the end portion 112a of the shaft 110a. The biasing force of the spring arms 212 and 214 urges the end portion 112a of the retractor shaft 110a upward into engagement with the upper portion 210 of the hub 206, that is, in a direction counter to the direction of the force of gravity acting on the shaft.

The spring arms 212 and 214 maintain the first end portion 112a of the retractor shaft 110a in this upward position to minimize vibration and rattling of the retractor shaft and the spool (not shown) of the retractor 10a. The hub 206 provides line contact with the retractor shaft 110a at three locations, that is, along the two spring arms 212 and 214 and along the rigid upper portion 210. The sensor plate (not shown) of the retractor 10a similarly maintains the opposite end portion of the retractor shaft 110a in engagement with the upper portion of the hub in the sensor plate.

Figure 12:
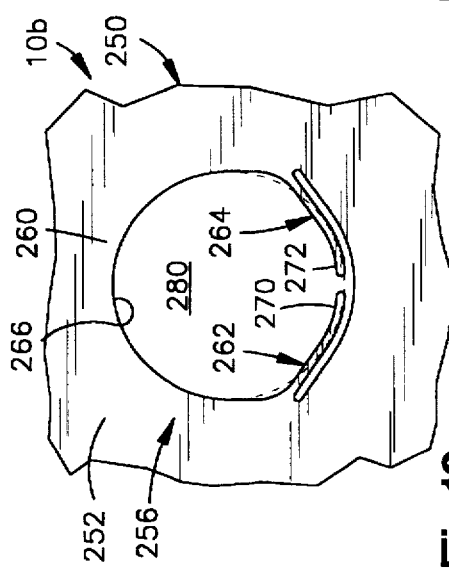
FIGS. 12 and 13 are schematic views of portions of a retractor constructed in accordance with a third embodiment of the present invention.
Figure 13:
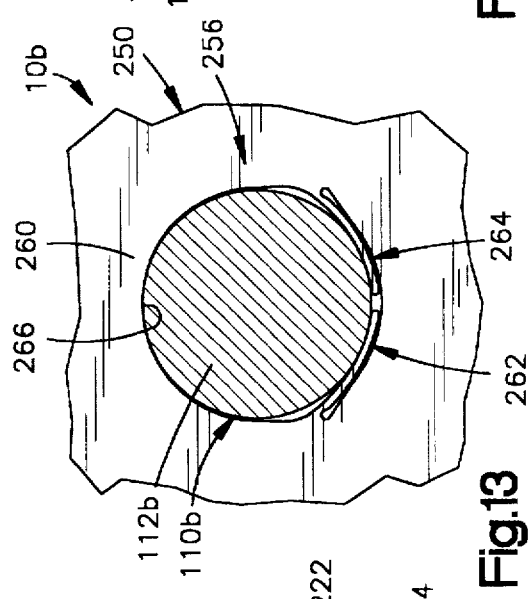

FIGS. 12-13 illustrate portions of a retractor 10b which is constructed in accordance with a third embodiment of the present invention. In the retractor 10b, a plastic spring plate 250 supports and biases a first end portion 112b of a retractor shaft 110b. The spring plate 250 may be substituted in the retractor 10 for the spring plate 80 and the first positioning spring 130. A sensor plate (not shown) of the retractor 10b, which is identical to the spring plate 250, supports and biases the second end portion (not shown in FIGS. 10-11) of the retractor shaft 110b. The sensor plate (not shown) may be substituted in the retractor 10 for the sensor plate 90 and the second positioning spring 140.

The spring plate 250 (FIGS. 12 and 13) is fixed to the first side wall (not shown) of the frame of the retractor 10b. The spring plate 250 is molded from one piece of plastic, such as acetal, and includes a planar main wall portion 252 and a hub 256. The hub 256 comprises three portions of the spring plate 250 which support the first end portion 112b of the retractor shaft 110b at three spaced apart locations.

Specifically, the hub 256 includes an upper portion 260, a first cantilevered spring arm 262 and a second cantilevered spring arm 264. The upper portion 260 of the hub 256 is a rigid part of the main wall portion 252 of the spring plate 250. The upper portion 260 of the hub 256 has a cylindrical inner surface 266. The surface 266 is configured as a portion of a cylinder which has a diameter slightly greater than the outside diameter of the first end portion 112b of the shaft 110b. The first cantilevered spring arm 262 is resilient or flexible, and is movable relative to the upper portion 260.

The first spring arm 262 has a cylindrical inner surface 270. The surface 270 is configured as a portion of a cylinder which has a diameter slightly greater than the outside diameter of the first end portion 112b of the shaft 110b.

The second cantilevered spring arm 264 is similar in configuration to the first spring arm 262. The second spring arm 264 is resilient or flexible, that is, movable relative to the upper portion 260. The second spring arm 264 has a cylindrical inner surface 272. The surface 272 is configured as a portion of a cylinder which has a diameter slightly greater than the outside diameter of the first end portion 112b of the shaft 110b.

When the spring plate 250 is in a free or unstressed condition, the cantilevered spring arms 262 and 264 are in a radially inward position as shown in FIG. 12. The spring arms 262 and 264, and the upper portion 260, define an opening 280 into which the end portion 112b of the retractor shaft 110b is inserted during assembly of the retractor 10b.

When the spring plate 250 is assembled with the first end portion 112b of the retractor shaft 110b, the cantilevered spring arms 262 and 264 are moved radially outward by the retractor shaft, to the position shown in FIG. 11, against the inherent resistance of the spring arms. Each one of the spring arms 262 and 264 exerts a radially inwardly directed biasing force on the end portion 112b of the shaft 110b. The combined biasing forces of the spring arms 262 and 264 urges the end portion 112b of the retractor shaft 110b upward into engagement with the upper portion 260 of the hub 256, that is, in a direction counter to the direction of the force of gravity acting on the shaft.

The cantilevered spring arms 262 and 264 maintain the first end portion 112b of the retractor shaft 110b in this upward position to minimize vibration and rattling of the retractor shaft and the spool (not shown) of the retractor 10b. The hub 256 provides line contact with the retractor shaft 110b at three locations, that is, along the two spring arms 262 and 264 and along the rigid upper portion 260. The sensor plate (not shown) of the retractor 10b similarly maintains the opposite end portion of the retractor shaft 110b in engagement with the upper portion of the hub in the sensor plate.

Figure 14:
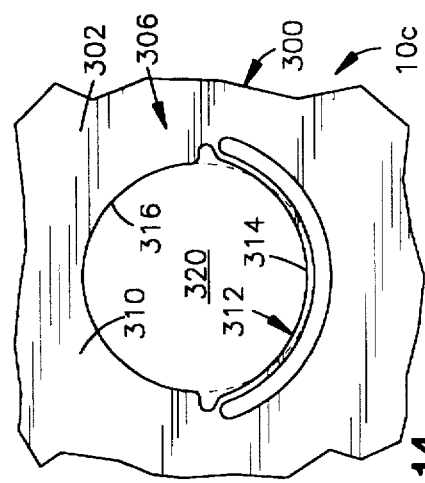
FIGS. 14 and 15 are schematic views of portions of a retractor constructed in accordance with a fourth embodiment of the present invention.
Figure 15:
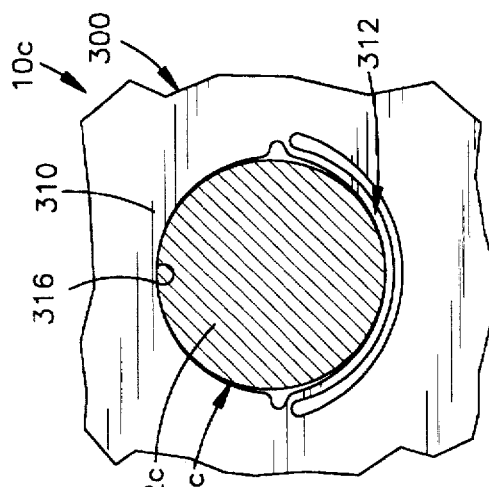

FIGS. 14-15 illustrate portions of a retractor 10c which is constructed in accordance with a fourth embodiment of the present invention. In the retractor 10c, a plastic spring plate 300 supports and biases a first end portion 112c of a retractor shaft 110c. The spring plate 300 may be substituted in the retractor 10 for the spring plate 80 and the first positioning spring 130. A sensor plate (not shown) of the retractor 10c, which is identical to the spring plate 300, supports and biases the second end portion (not shown in FIGS. 10-11) of the retractor shaft 110c. The sensor plate (not shown) may be substituted in the retractor 10 for the sensor plate 90 and the second positioning spring 140.

The spring plate 300 (FIGS. 14 and 15) is fixed to the first side wall (not shown) of the frame of the retractor 10c. The spring plate 300 is molded from one piece of plastic, such as acetal, and includes a planar main wall portion 302 and a hub 306. The hub 306 comprises two portions of the spring plate 300 which support the first end portion 112c of the retractor shaft 110c.

Specifically, the hub 306 includes an upper portion 310 and a single spring arm 312. The upper portion 310 of the hub 306 is a rigid part of the main wall portion 302 of the spring plate 300. The upper portion 310 of the hub 306 has a cylindrical inner surface 316. The surface 316 is configured as a portion of a cylinder which has a diameter slightly greater than the outside diameter of the first end portion 112c of the shaft 110c.

The spring arm 312 is connected at its opposite ends with the main wall portion 302 of the spring plate 300. The spring arm 312 is resilient or flexible, and is movable relative to the upper portion 310. The spring arm 312 has an inner surface 314. The surface 314 is configured as a portion of a cylinder which has a diameter slightly greater than the outside diameter of the first end portion 112c of the shaft 110c.

When the spring plate 300 is in a free or unstressed condition, the spring arm 312 is in a radially inward position as shown in FIG. 14. The spring arm 312 and the upper portion 310 define an opening 320 into which the end portion 112c of the retractor shaft 110c is inserted during assembly of the retractor 10c.

When the spring plate 300 is assembled with the first end portion 112c of the retractor shaft 110c, the spring arm 312 is moved radially outward by the retractor shaft, to the position shown in FIG. 15, against the inherent resistance of the spring arm. The spring arm 312 exerts a radially inwardly directed biasing force on the end portion 112c of the shaft 110c. The biasing force of the spring arm urges the end portion 112c of the retractor shaft 110c upward into engagement with the upper portion 310 of the hub 306, that is, in a direction counter to the direction of the force of gravity acting on the shaft.

The spring arm 312 maintains the first end portion 112c of the retractor shaft 110c in this upward position to minimize vibration and rattling of the retractor shaft and the spool (not shown) of the retractor 10c. The sensor plate (not shown) of the retractor 10c similarly maintains the opposite end portion of the retractor shaft 110c in engagement with the upper portion of the hub in the sensor plate.

From the above description of the invention, those skilled in the art will perceive improvements, changes and modifications in the invention. For example, the retractor shaft need not be an element separate from the spool. The retractor shaft may, for example, comprise axially projecting portions of the spool which support the spool for rotation. Such improvements, changes and modifications within the skill of the art are intended to be covered by the appended claims.

Having described the invention, we claim:

1. A vehicle seat belt retractor for use in association with a length of seat belt webbing extensible about a vehicle occupant to help protect the vehicle occupant, said retractor comprising:

a spool on which the seat belt webbing is wound and which is rotatable about an axis in a belt retraction direction and in an opposite belt withdrawal direction;

a shaft fixed for rotation with said spool, said shaft being acted upon by a first force due to gravity;

the seat belt webbing providing a second force on said shaft acting counter to said first force when the seat belt webbing is withdrawn from said spool; and means for providing a biasing force on said shaft acting counter to said first force;

said means for providing a biasing force comprising a pair of springs located at opposite ends of said spool, said springs supporting said shaft for rotation about said axis, said springs acting against said shaft and in a direction opposite to said first force due to gravity.

2. A vehicle seat belt retractor comprising:

a length of seat belt webbing which is extensible about a vehicle occupant to restrain a vehicle occupant;

a support frame having spaced apart first and second side walls, each of said side walls having a shaft opening;

a first side plate attached to said first side wall and a second side plate attached to said second side wall, each one of said first and second side plates having a shaft opening;

a shaft having an axis and extending through said shaft openings in said frame side walls and through said shaft openings in said side plates, said shaft being supported for rotation against said first and second side plates;

a spool on which said belt webbing is wound and which is rotatable in a belt retraction direction and in an opposite belt withdrawal direction, said spool being fixed for rotation with said shaft;

first spring means for biasing a first portion of said shaft against a surface defining said shaft opening in said first side plate, said first spring means including a portion for biasing said spool away from an inner side surface of said first side wall of said support frame; and second spring means for biasing a second portion of said shaft against a surface defining said shaft opening in said second side plate, said second spring means including a portion for biasing said spool away from an inner side surface of said second side wall of said support frame.

3. A seat belt retractor as set forth in claim 2 wherein said spool includes first and second spool locking ratchet wheels located between said first and second side walls of said support frame, said spring means comprising first and second M-shaped springs, said first M-shaped spring acting between said first side wall of said support frame and said first ratchet wheel, said second M-shaped spring acting between said second side wall of said frame and said second ratchet wheel.

4. A seat belt retractor as set forth in claim 2 wherein said spring means provides a biasing force on said shaft acting counter to the force of gravity acting on said shaft.

5. A vehicle seat belt retractor for use in association with a length of seat belt webbing extensible about a vehicle occupant to help protect the vehicle occupant, said retractor comprising:

a spool on which the seat belt webbing is wound and which is rotatable about an axis in a belt retraction direction and in an opposite belt withdrawal direction;

a shaft fixed for rotation with said spool, said shaft being acted upon by gravity with a first force;

the seat belt webbing providing a second force on said shaft acting counter to said first force when the seat belt webbing is withdrawn from said spool; and means for providing a biasing force on said shaft acting counter to said first force;

said means for providing a biasing force on said shaft comprising means for providing a biasing force acting on said shaft and having a magnitude which is at least twice the magnitude of the force of gravity acting on said shaft.

6. A seat belt retractor as set forth in claim 5 further comprising a support frame having two side walls spaced apart on opposite sides of said spool a first side plate attached to a first one of said side walls, and a second side plate attached to a second one of said side walls, said means for providing a biasing force supporting said shaft for rotation against said side plates.

7. A seat belt retractor as set forth in claim 6 wherein said means for providing a biasing force comprises a pair of M-shaped springs.

8. A seat belt retractor as set forth in claim 6 wherein each one of said M-shaped springs is made from steel wire.

9. A seat belt retractor as set forth in claim 7 wherein each one of said M-shaped springs is made from plastic.

10. A vehicle seat belt retractor for use in association with a length of seat belt webbing extensible about a vehicle occupant to help protect the vehicle occupant, said retractor comprising:

a spool on which the seat belt webbing is wound and which is rotatable about an axis in a belt retraction direction and in an opposite belt withdrawal direction;

a shaft fixed for rotation with said spool, said shaft being acted upon by gravity with a first force the seat belt webbing providing a second force on said shaft acting counter to said first force when the seat belt webbing is withdrawn from said spool;

means for providing a biasing force on said shaft acting counter to said first force;

a support frame having two side walls spaced apart on opposite sides of said spool;

a first side plate attached to a first one of said side walls; and a second side plate attached to a second one of said side walls;

said means for providing a biasing force supporting said shaft for rotation against said side plates;

said means for providing a biasing force comprising a pair of springs each having a portion for biasing said spool axially in a direction away from an inner side surface of a respective one of said side walls of said support frame.

11. A seat belt retractor as set forth in claim 10 wherein said spool includes a pair of ratchet wheels located between said side walls of said support frame, each one of said springs being located between an inner side surface of one of said side walls and a radially extending surface of one of said ratchet wheels.

12. A seat belt retractor as set forth in claim 11 wherein each of said springs has an M-shaped configuration including a first end portion and a second end portion, each of said end portions having a first mounting part which is axially oriented and a second mounting part which is radially oriented.

13. A seat belt retractor as set forth in claim 12 wherein each one of said M-shaped springs has an arcuate central portion supporting said retractor shaft for rotation about said axis.

14. A seat belt retractor as set forth in claim 13 wherein said central portion of each spring is offset in an axial direction from said first and second leg portions of said spring.

15. A seat belt retractor as set forth in claim 14 wherein each one of said springs has first and second arcuate sections in contact with a radially extending surface of one of said ratchet wheels.

16. A vehicle seat belt retractor for use in association with a length of seat belt webbing extensible about a vehicle occupant to help protect the vehicle occupant, said retractor comprising:

a spool on which the seat belt webbing is wound and which is rotatable about an axis in a belt retraction direction and in an opposite belt withdrawal direction;

a shaft fixed for rotation with said spool, said shaft being acted upon by gravity with a first force;

the seat belt webbing providing a second force on said shaft acting counter to said first force when the seat belt webbing is withdrawn from said spool; and means for providing a biasing force on said shaft acting counter to said first force;

said means for providing a biasing force comprising a pair of springs located at opposite ends of said spool, said springs supporting said shaft for rotation about said axis, each one of said springs including portions for biasing said spool in an axial direction.

17. A retractor as set forth in claim 16 wherein each one of said springs has an M-shaped configuration.

* * * * *

UNITED STATES PATENT AND TRADEMARK OFFICE
CERTIFICATE OF CORRECTION

PATENT NO. : 5 735 478
DATED : April 7, 1998
INVENTOR(S) : Ivanna G. Malinow, Harley L. Kapanka and Lloyd M. Snyder It is certified that error appears in the above-indentified patent and that said Letters Patent is hereby corrected as shown below:

Column 13, line 14, change "6" to --7--.

Column 13, line 26, after "force" insert --;--.

Signed and Sealed this

Fifteenth Day of September, 1998

Attest:

BRUCE LEHMAN

Attesting Officer *Commissioner of Patents and Trademarks*